Dec. 23, 1969  A. CANTARUTTI ETAL  3,484,898
TIRE CURING PRESS
Filed Sept. 13, 1967  3 Sheets-Sheet 1
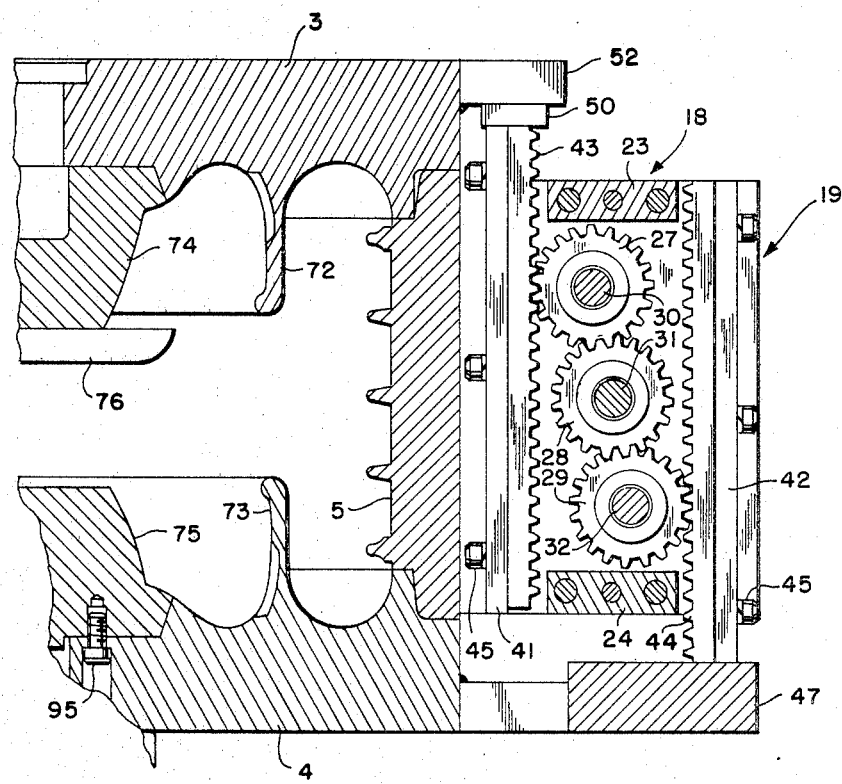
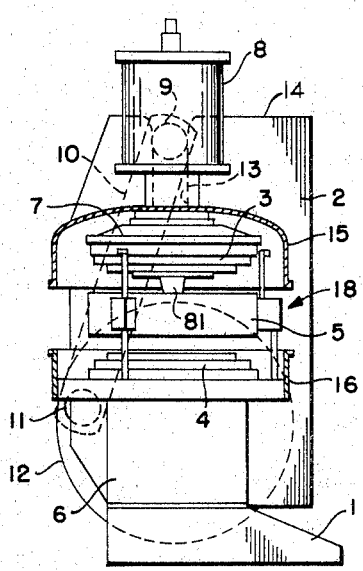
INVENTORS
ARMINDO CANTARUTTI
STEPHEN F. BREZA
BY
Oberlin, Maky, Donnelly & Renner
ATTORNEYS Dec. 23, 1969 A. CANTARUTTI ET AL 3,484,898
TIRE CURING PRESS
Filed Sept. 13, 1967 3 Sheets-Sheet 2
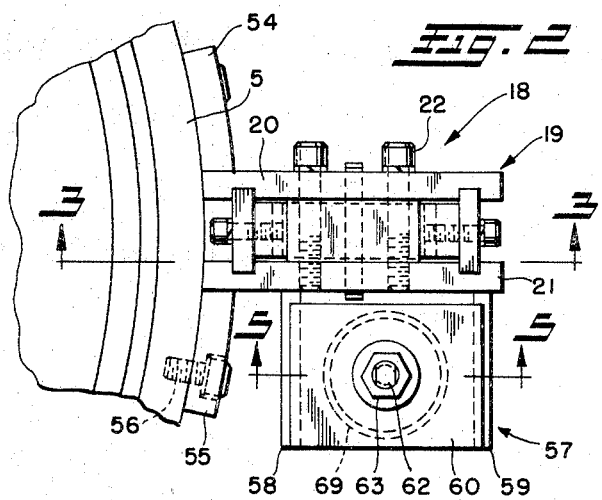
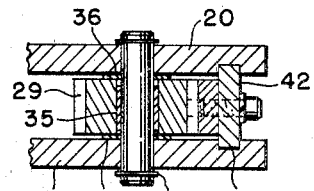
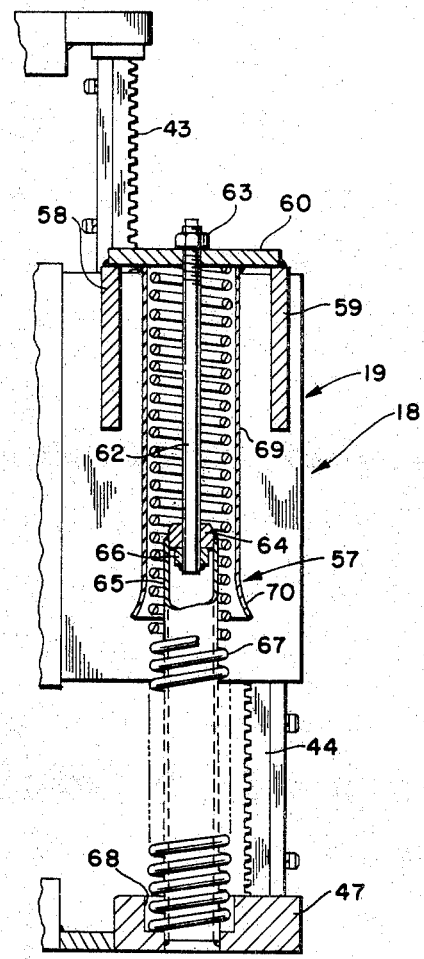
INVENTORS
*ARMINDO CANTARUTTI*
*STEPHEN F. BREZA*
BY
*Oberlin, Maky, Donnelly & Renner*
ATTORNEYS

United States Patent Office 3,484,898
Patented Dec. 23, 1969

3,484,898
TIRE CURING PRESS
Armindo Cantarutti, Akron, and Stephen F. Breza, Cuyahoga Falls, Ohio, assignors to NRM Corporation, a corporation of Ohio
Filed Sept. 13, 1967, Ser. No. 667,480
Int. Cl. B29h 5/02
U.S. Cl. 18—17                16 Claims

ABSTRACT OF THE DISCLOSURE

A tire press having a movable top side wall mold section and a stationary bottom side wall mold section and an annular tread mold section positioned therebetween, a center positioner for the tread mold section maintaining the tread mold section equidistant from the side wall mold section as the latter come together to shape a tire.

---

This invention relates generally as indicated to a tire curing press and more particularly to a press which will produce exceptionally accurate tires.

Where shaping of tires occurs within a tire press, the centering of the tread with respect to the beads and thus the side walls is always a problem. If the tread is not properly positioned with respect to the beads, this may result in tires having one side wall wider than the other creating lateral run-out which, if excessive, may result in scrap tires. This is a particular problem in the curing of collapsible tires which are cured in a folded form. Accordingly, the elimination of lateral run-out in tires is desirable and this is true with respect to all tires where shaping occurs in the press and whether or not a bag or bagless cure is employed.

It is accordingly a principal object of the present invention to provide tire curing apparatus which will ensure the centering of the tread with respect to the beads and side walls.

Another principal object is the provision of a tire press which will accurately shape and cure tires minimizing lateral run-out.

Another object is the provision of a tire press having top and bottom side wall mold sections with an annular tread section positioned therebetween and maintained equidistant from the side wall mold sections as the press closes and a tire is shaped therein.

A further object is the provision of a tire press having an annular tread section supported by one side wall section and moved by the other at a speed only half of the other to be maintained equidistant from the side wall mold sections as the press closes and a tire is shaped therebetween.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principles of the invention may be employed.

In said annexed drawings:

FIG. 1 is a side elevation on a reduced scale partially broken away and in section of a tire press in accordance with the present invention;

FIG. 2 is a fragmentary top plan view of a center positioner for the tread mold section on an enlarged scale;

FIG. 4 is a horizontal section showing a detail of the rack and pinion drive taken substantially on the line 4—4 of FIG. 3;

FIG. 5 is a fragmentary vertical section taken substantially on the line 5—5 of FIG. 2; and FIG. 6 is a vertical section similar to FIG. 3 showing the press closed.

Figure 3:
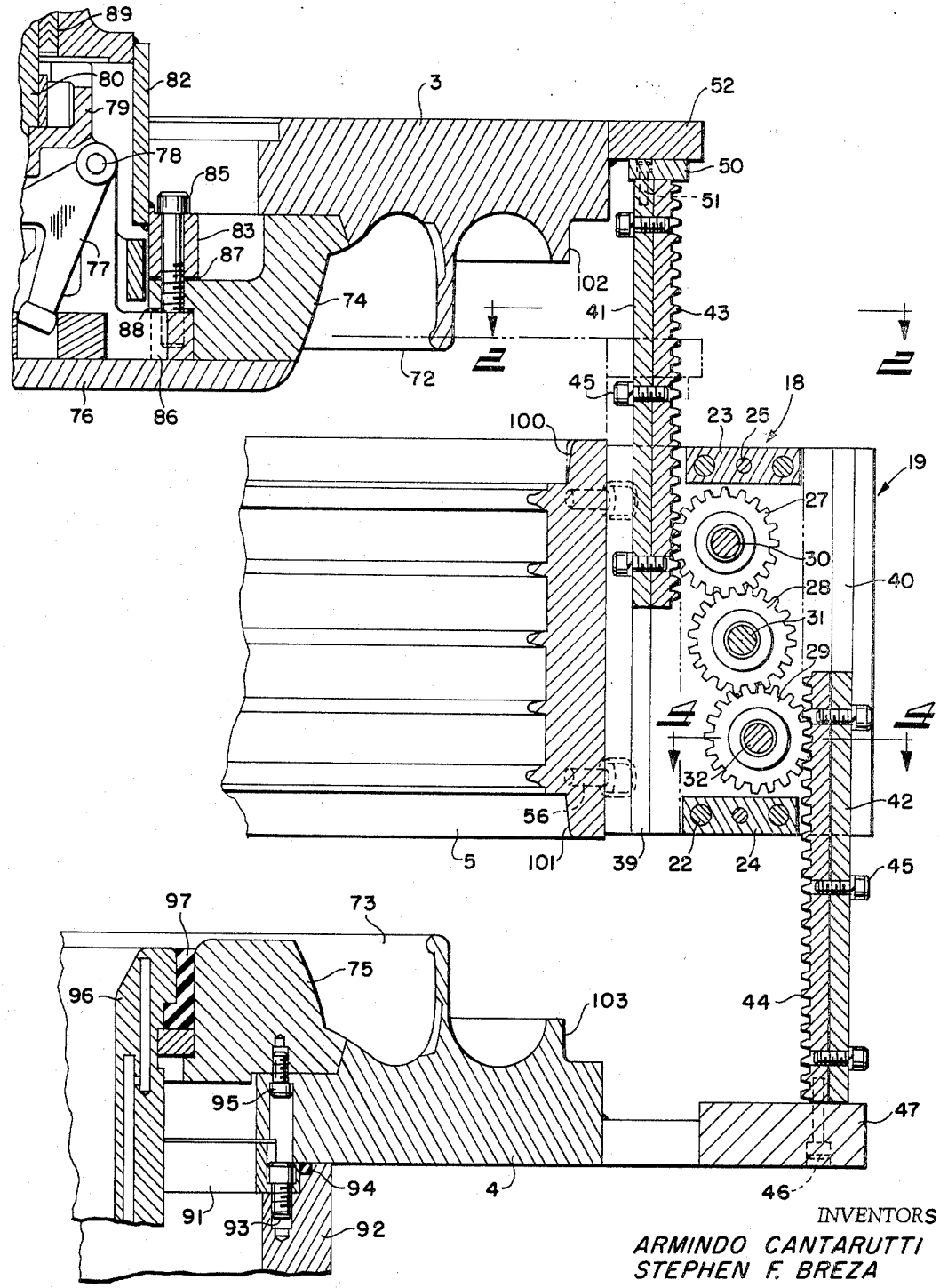
FIG. 3 is a vertical section partially broken away taken substantially on the line 3—3 of FIG. 2.

Referring first to FIG. 1, there is illustrated a tire press which comprises a base 1 having two upstanding side cam plates 2 at each end thereof between which are positioned two side-by-side mold cavities, each of which is formed by a top side wall mold section 3, a bottom side wall mold section 4 and an annular tread section 5. The lower side wall mold section 4 is supported in a stationary manner on the base framing 6 while the upper side wall mold section 3 is mounted beneath bolster 7 supported from beam 8. Longitudinally projecting pins 9 in the beam 8 are supported by links 10 which are pin-connected at 11 to power driven bull gears 12 which are mounted exteriorly of the side plates 2. When the bull gears 12 rotate in a clockwise direction as viewed in FIG. 6, the pins 9 ride up slot 13 and back along the top edge 14 to move the top side wall mold section 3 upwardly away from the lower side wall mold section 4 and laterally clear of the lower stationary side wall mold section 4 so that the press can be loaded. When the press is closed, the bull gears will be rotated in a counterclockwise direction and the beam or head 8 will move to a position directly above the lower side wall mold section and continued rotation of the bull gears will cause the pins 9 to move vertically downwardly in the slot 13 closing the press. For a more clear illustration of the general type of press with which this invention may be employed, reference may be had to Mallory et al. U.S. Patent No. 3,065,499 or Heston et al. U.S. Patent No. 3,229,329.

The press may be either of the platen type or steam dome type as illustrated in FIG. 1 wherein the upper side wall mold section 3 is enclosed by dome 15 which, when the press closes, engages and seals against the upper edge of shell 16 to form a steam dome or chamber for the curing of the tire.

In the illustrated embodiment, the annular tread mold section 5 is supported from the base 6 or lower side wall mold section 4 by three equally peripherally spaced center positioners shown generally at 18. One such positioner is shown in greater detail in FIGS. 2, 3, 4 and 5.

Referring first to FIGS. 2 and 3, it will be seen that the positioner comprises a gear housing 19 which includes right and left hand side plates 20 and 21 interconnected by fasteners 22 extending through spacer blocks 23 and 24 at the top and bottom. Dowel pins 25 also extend between such side plates through the spacer blocks.

As seen more clearly in FIG. 3, gears 27, 28 and 29 are mounted on shafts 30, 31 and 32, respectively, which extend between the side plates. The shafts are each slightly radially offset from the other and as seen in FIG. 4, such shafts are held in place by snap rings 34 at each end and the gears are journalled on such shafts by bushings 35 with thrust washers 36 and 37 being provided between each gear and the side plates 20 and 21, respectively.

The side plates 20 and 21 are provided with opposed vertical slots as seen at 39 and 40 in FIG. 3 which receive keys 41 and 42, respectively, to which are secured racks 43 and 44 by the suitable fasteners shown at 45. The key 42 and the rack 44 secured thereto is secured in upright fashion by fastener 46 to extension 47 of the lower side wall mold 4.

The rack 44 is in mesh with the gear 29 and clears the intermediate idle gear 28 as well as the top gear 27.